(12) United States Patent
Akiba

(10) Patent No.: US 9,949,468 B2
(45) Date of Patent: Apr. 24, 2018

(54) FISHING LINE GUIDE AND FISHING ROD

(71) Applicant: Globeride, Inc., Tokyo (JP)

(72) Inventor: Masaru Akiba, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 276 days.

(21) Appl. No.: 14/470,170

(22) Filed: Aug. 27, 2014

(65) Prior Publication Data

US 2015/0059232 A1    Mar. 5, 2015

(30) Foreign Application Priority Data

Aug. 30, 2013    (JP) .................................. 2013-178865

(51) Int. Cl.
*A01K 87/04*    (2006.01)

(52) U.S. Cl.
CPC ..................... *A01K 87/04* (2013.01)

(58) Field of Classification Search
CPC ....................................................... A01K 87/04
USPC .............................................. 43/24; D22/143
See application file for complete search history.

(56) References Cited

U.S. PATENT DOCUMENTS

| | | | | | |
|---|---|---|---|---|---|
| 2,740,221 | A | * | 4/1956 | Kono ...................... | A01K 87/04 43/24 |
| 3,403,468 | A | * | 10/1968 | Bartoletti ................ | A01K 87/04 43/24 |
| 3,690,027 | A | * | 9/1972 | Ohmura ................. | A01K 87/04 43/24 |
| 4,080,748 | A | * | 3/1978 | Ohmura ................. | A01K 87/04 43/24 |
| 4,141,132 | A | * | 2/1979 | Ohmura ................. | A01K 87/04 43/24 |
| 4,428,140 | A | * | 1/1984 | Yamamoto ............. | A01K 87/04 43/24 |
| 5,802,759 | A | * | 9/1998 | Ohmura ................. | A01K 87/04 43/24 |
| 5,870,848 | A | * | 2/1999 | Ohmura ................. | A01K 87/04 43/24 |

(Continued)

FOREIGN PATENT DOCUMENTS

| | | |
|---|---|---|
| CN | 101185430 | 5/2008 |
| CN | 03200816 | 7/2013 |

(Continued)

OTHER PUBLICATIONS

Translation of JP 2008-125463.*

(Continued)

*Primary Examiner* — Darren W Ark
(74) *Attorney, Agent, or Firm* — Pillsbury Winthrop Shaw Pittman, LLP

(57) ABSTRACT

One object is to provide a fishing line guide that allows a line snagged in a loop to be released readily. The line guide 5 according to the present invention include a frame including a fixing portion fixed on the outer surface of the rod, a ring retainer retaining a guide ring that admits the line, and a connecting portion connecting the ring retainer and the fixing portion. For a width Wa of the frame at the inflection point between the connecting portion and the ring retainer and a maximum width Wb of the ring retainer, the frame 5A is formed such that the width Wa is equal to or greater than 70% of the maximum width Wb.

4 Claims, 3 Drawing Sheets

(56) References Cited

U.S. PATENT DOCUMENTS

| | | | | |
|---|---|---|---|---|
| 6,067,743 | A * | 5/2000 | Ohmura | A01K 87/04 43/24 |
| 8,365,458 | B2 * | 2/2013 | Omura | A01K 87/04 43/24 |
| 8,387,302 | B2 | 3/2013 | Akiba et al. | |
| D698,408 | S * | 1/2014 | Akiba | D22/143 |
| 9,210,918 | B2 * | 12/2015 | Omura | A01K 87/04 |
| 9,510,574 | B2 * | 12/2016 | Omura | A01K 87/04 |
| 9,591,836 | B2 * | 3/2017 | Omura | A01K 87/04 |
| 9,609,854 | B2 * | 4/2017 | Akiba | A01K 87/04 |
| 2005/0172535 | A1 * | 8/2005 | Lee | A01K 87/04 43/24 |
| 2005/0193618 | A1 * | 9/2005 | Yu | A01K 87/04 43/24 |
| 2013/0192120 | A1 | 8/2013 | Akiba et al. | |
| 2013/0205640 | A1 * | 8/2013 | Omura | A01K 87/04 43/24 |
| 2015/0059232 | A1 | 3/2015 | Akiba | |
| 2015/0089857 | A1 * | 4/2015 | Akiba | A01K 87/04 43/24 |
| 2016/0088821 | A1 * | 3/2016 | Omura | A01K 87/06 43/22 |

FOREIGN PATENT DOCUMENTS

| | | | | |
|---|---|---|---|---|
| CN | 103200816 | | 7/2013 | |
| JP | 10-136839 | | 5/1998 | |
| JP | 2002-112674 | | 4/2002 | |
| JP | 2002112674 | A * | 4/2002 | |
| JP | 2004089055 | A * | 3/2004 | |
| JP | 2007274931 | A * | 10/2007 | |
| JP | 2008-125463 | | 6/2008 | |
| JP | 2008125463 | A * | 6/2008 | |
| JP | 2010-130988 | | 6/2010 | |
| JP | 2010130988 | A * | 6/2010 | |
| JP | 2010-154860 | A | 7/2010 | |
| JP | 2011092074 | A * | 5/2011 | |
| JP | 2011-110007 | | 6/2011 | |
| JP | 4693751 | B2 | 6/2011 | |
| JP | 2011-239777 | | 12/2011 | |
| JP | 2011239777 | A * | 12/2011 | |
| JP | 2012100616 | A * | 5/2012 | |
| JP | 2013158309 | A * | 8/2013 | |
| JP | 2013247867 | A * | 12/2013 | A01K 87/04 |
| JP | 2014128295 | A * | 7/2014 | |
| JP | 2014135914 | A * | 7/2014 | |
| JP | 2015-047079 | A | 3/2015 | |
| JP | 2016135103 | A * | 7/2016 | |
| WO | WO 2011102398 | A1 * | 8/2011 | A01K 87/04 |

OTHER PUBLICATIONS

Translation of JP 2013-158309.*
Chinese Office Action dated Jan. 25, 2016, for Application No. 201410425501.4.
Chinese Office Action dated Jul. 5, 2016, for Application No. 201410425501.4.
European Search Report dated Feb. 5, 2015 for Appln. No. 14182602.4.
Japanese Office Action dated Nov. 24, 2016 for Appln. No. 2013-178865.
European Office Action dated Oct. 13, 2016 for Appln. No. 14182602.4.
Japanese Office Action dated Aug. 4, 2016 for Application No. 2013-178865.
European Patent Office Communication Pursuant to Article 94(3) EPC—EP Application No. 14 182 602.4 dated Oct. 26, 2017.
Third Office Action issued in Chinese Patent Application No. 201410425501.4 dated Sep. 21, 2016, with English translation.
Rejection Decision issued in Chinese Patent Application No. 201410425501.4 dated Jan. 24, 2017 with English translation.
Non-Final Office Action Korean Patent Application No. 10-2014-0100335 dated May 29, 2017 with English translation.
Non-Final Office Action issued in Japanese Patent Application No. 2017-012653 dated Nov. 22, 2017 with English translation.
Rejection Decision Korean Patent Application No. 10-2014-0100335 dated Dec. 21, 2017 with English translation.

* cited by examiner

FISHING LINE GUIDE AND FISHING ROD

CROSS-REFERENCE TO RELATED APPLICATIONS

This application is based on and claims the benefit of priority from Japanese Patent Application Serial No. 2013-178865 (filed on Aug. 30, 2013), the contents of which are hereby incorporated by reference in their entirety.

TECHNICAL FIELD

The present invention relates to a fishing line guide mounted on a fishing rod for guiding a line and in particular, to a fishing line guide that readily releases a line snagged thereon in actual fishing and a fishing rod having such a fishing line guide mounted thereon.

BACKGROUND

Conventionally, a line guide includes a frame mounted on an outer surface of a rod, and a guide ring secured on the frame for admitting a line. As disclosed in, e.g., Japanese Patent Application Publication No. 10-136839 (the "'839 Publication"), the frame is integrally formed by pressing a metallic plate made of stainless steel, titanium, etc. and the frame integrally includes a ring retainer retaining the guide ring for admitting a line and a fixing portion to be fixed on the outer surface of the rod. Recently, as disclosed in Japanese Patent Application Publication No. 2011-110007, it has been known to form a frame of a fiber-reinforced resin material.

As disclosed in the '839 Publication, a fishing line guide generally has a forwardly-slanted structure (60 to 45°) so as to readily release a fishing line snagged thereon.

The fixing portion of the line guide is narrower toward the rod tip so as to conform to the rod diameter. Therefore, the connecting portion between the fixing portion and the ring retainer significantly protrudes in a widthwise direction, making it difficult to release a line snagged thereon in a loop. Particularly in boat fishing, when a line is snagged on any one of line guides mounted on the outer surface of a rod at an interval, the line is hard to be released even with the rod tip pointed down and have to be reached by a hand for release.

The reason that a line is snagged persistently on a line guide in a loop resides in that, at the connecting portion between the fixing portion of the line guide and the ring retainer, the ring retainer significantly protrudes in the widthwise direction (in a direction orthogonal to the axial direction of the rod). Additionally, the portion connecting the ring retainer formed tabularly and the fixing portion fixed on the surface of the rod (hereinafter referred to as "connecting portion") is usually formed of a short curved surface for manufacturing reasons. A line is often snagged on such a curved surface (the base of the ring retainer) and stopped at the border with the guide ring retainer protruding ahead of the curved surface, or more specifically, at an inflection point between the connecting portion and the guide ring retainer. Thus, the line becomes unreleasable.

SUMMARY

The present invention is intended to overcome the above problem. One object of the present invention is to provide a fishing line guide that readily releases a fishing line snagged thereon in a loop and a fishing rod having such a fishing line guide mounted thereon.

To the above end, the present invention is a fishing line guide mounted on a fishing rod for guiding a line in an axial direction, the fishing line guide comprising: a frame including a fixing portion fixed on the outer surface of the rod, a ring retainer retaining a guide ring for admitting the line, and a connecting portion connecting the ring retainer and the fixing portion, wherein, for a width Wa of the frame at an inflection point between the connecting portion and the ring retainer and a maximum width Wb of the ring retainer, the frame is formed such that the width Wa is equal to or greater than 70% of the maximum width Wb.

Normally, a line snagged on a frame of a line guide in a loop tends to release itself in the direction of the rod tip; but the position of the inflection point between the connecting portion and the ring retainer in the frame makes the highest resistance. That is, the line is prone to be snagged on a side of the frame at the inflection point. The above frame is formed such that the width Wa of the frame at the inflection point between the connecting portion and the ring retainer is equal to or greater than 70% of the maximum width Wb of the ring retainer; therefore, a line snagged at the inflection point where the line is prone to be stopped can move from this point toward the ring retainer and then away from the frame.

In the above arrangement, the ring retainer of the frame corresponds to the portion on which a guide ring for admitting a line is fixed (by press fit, adhesion, caulking, etc.); this portion is planar as viewed from a side. The fixing portion of the frame corresponds to the portion fixed on the outer surface of the rod by a thread, etc. The ring retainer and the fixing portion are connected via the connecting portion. The connecting portion is bent and raised from the fixing portion such that the ring retainer retains the guide ring at a predetermined distance from the outer surface of the rod. Since the connecting portion is raised from the fixing portion at a predetermined angle and is integrated with the ring retainer, the connecting portion is bent in a curve (or a straight line) as viewed from a side.

The length of the connecting portion (the distance between the inflection point with the fixing portion and the inflection point with the ring retainer) is not limited but may be large enough to allow movement of a line snagged in a loop and release the line stopped at the inflection point with the ring retainer.

The line guide and the rod of the present invention allow a line snagged in a loop to be readily released.

DESCRIPTION OF EXAMPLE EMBODIMENTS

Embodiments of a fishing line guide according to the invention are hereinafter described with reference to the drawings.

Figure 1:
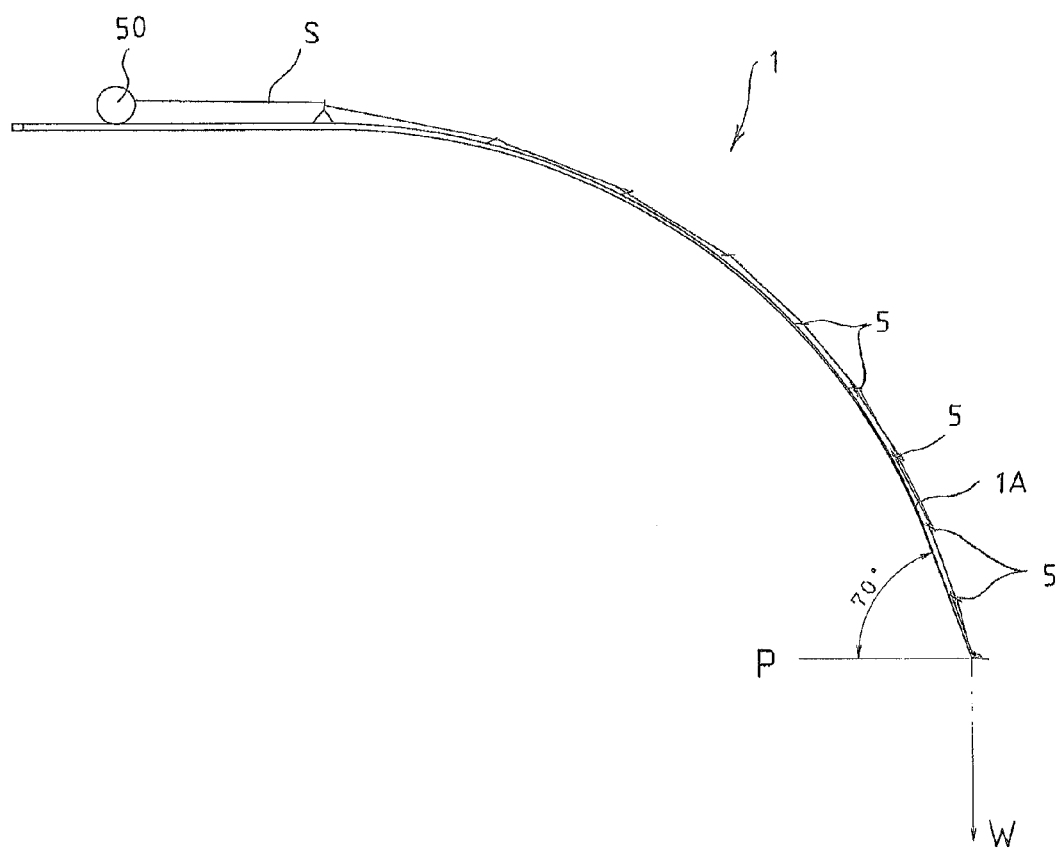
FIG. 1 illustrates a line snagged on a line guide mounted on a rod.

First, reference is made on FIG. 1 to describe the circumstances where a line is snagged on a line guide mounted on a rod.

On the outer surface of the rod 1 may be mounted line guides 5 spaced at an interval in the axial direction. The guide rings of the line guides 5 admit a line S let out from the fishing reel 50; and a terminal tackle having a weight (not shown) may be provided on the end of the line. FIG. 1 shows the rod 1 fixed on a gunwale for boat fishing, wherein the rod 1 is bent with a rod tip thereof pointed down due to the load of a weight W provided to the terminal tackle.

When the line S is snagged on any one of the line guides 5 in a loop, the line can be readily released if snagged on the frame slanted forwardly, but is hard to be released if snagged on the fixing portion. Normally, as the angle of the tip top pole 1A with respect to a horizontal plane P is closer to the vertical, the line S can be released more readily; but if the line is snagged on the fixing portion of the line guide, the line may not be released even if the angle shown in FIG. 1 is vertical. That is, when the line cannot be released even if the angle of the tip top pole 1A with respect to a horizontal plane P is vertical, an angler has to grab the tip top pole to release the snagged line. In the present invention, the frame is formed such that a line can be released at the angle of the tip top pole 1A with respect to the horizontal plane P being about 70° or smaller, as shown in FIG. 1. With this angle being about 70° or smaller, the line snagged in a loop can be released before the tip top pole reaches the angle of 90°, thereby freeing the angler from stresses.

Figure 2A:
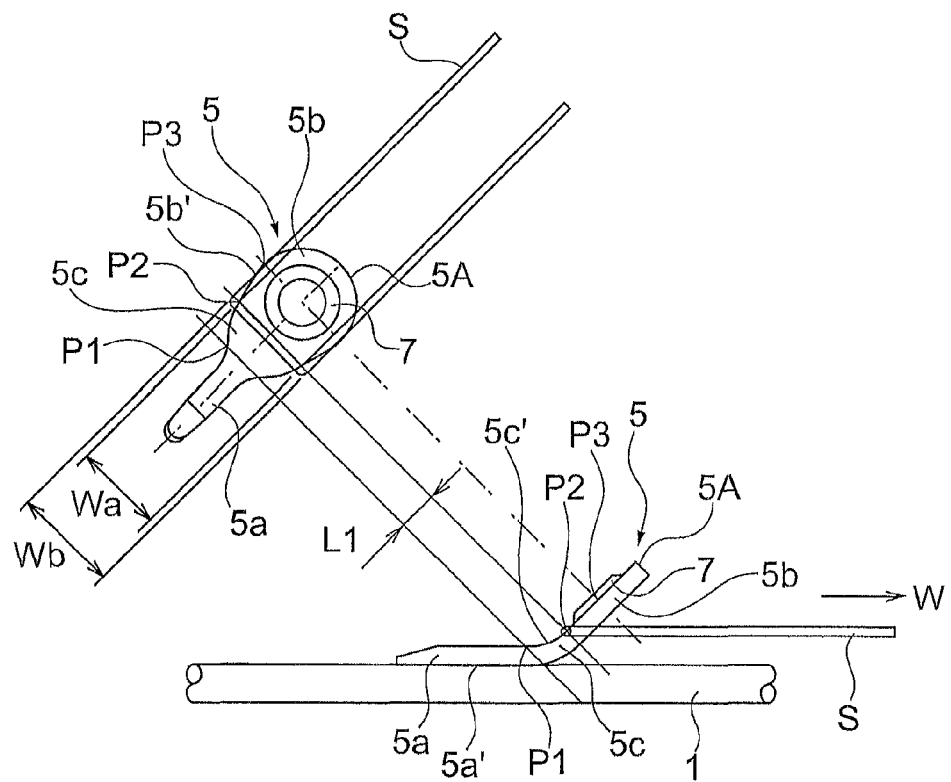
FIG. 2a illustrates the entire configuration of an embodiment of the line guide according to the present invention.
Figure 2B:
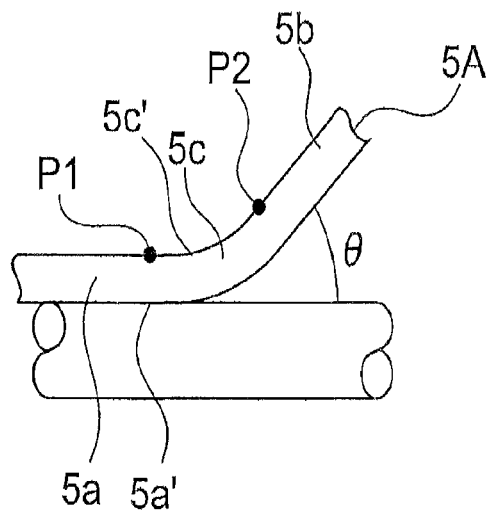
FIG. 2b is a side view of a main part of the same.

FIG. 2a illustrates the entire configuration of an embodiment of the line guide according to the present invention; and FIG. 2b is a side view of a main part of the same.

The line guide 5 of the embodiment may include a frame 5A formed of a fiber-reinforced prepreg (hereinafter referred to as "prepreg"). The prepreg is made of reinforced fiber impregnated with a synthetic resin. The frame 5A may include a fixing portion 5a fixed on the outer surface of the rod (rod tube) 1, a ring retainer 5b retaining a guide ring 7 for admitting the line, and a connecting portion 5c connecting the ring retainer 5b and the fixing portion 5a; and the frame 5A has a form of single foot guide.

The fixing portion 5a is a lower-end portion (also referred to as "leg") of the frame 5A that is fixed on the outer surface of the rod 1. In this embodiment, the fixing portion 5a may extend in the axial direction and may be fixed by a thread, an adhesive, etc. with a contacting surface 5a' in the back of the fixing portion 5a contacting the outer surface of the rod.

The ring retainer 5b may be a portion on which the guide ring 7 may be secured such that the line is guided at a distance from the outer surface of the rod. The ring retainer 5b may be plane as viewed from a side. The ring retainer 5b may have an opening into which the guide ring 7 may be fitted and fixed (by press fit, adhesion, caulking, etc.). The guide ring as a whole may have a generally circular outer shape. The guide ring 7 fitted into the opening may be formed of, e.g., titanium, aluminum, SUS, ceramic, so as to have a small sliding resistance at the inner circumferential surface (line guiding surface) thereof. The guide ring can have any desired shape such as a general ellipse, not limited to a circle as shown in the figure.

The connecting portion 5c may connect the fixing portion 5a and the ring retainer 5b such that the guide ring 7 may be spaced from the surface of the rod. More specifically, the connecting portion 5c may raise the guide ring 5b from the fixing portion 5a at a predetermined angle θ and may be curved from the fixing portion 5a and integrated with the ring retainer 5b. Thus, as viewed from a side, the connecting portion 5c may have an inflection point P1 adjacent to the fixing portion 5a and an inflection point P2 adjacent to the ring retainer 5b.

The length of the connecting portion 5c (the distance L1 between the inflection points P1 and P2; that is, the distance between a perpendicular line with respect to the ring retainer 5b passing through the inflection point P1 and a perpendicular line with respect to the ring retainer 5b passing through the inflection point P2) is not limited but may be large (L1 should preferably be about 2 to 4 mm for an outer diameter of a ring being about 3.9 to 5.3 mm) enough to allow movement of the line snagged in a loop and release the line stopped at the inflection point P2.

For a width Wa of the frame 5A at the inflection point P2 between the connecting portion 5c and the ring retainer 5b and a maximum width Wb of the ring retainer 5b, the frame 5A may be formed such that the width Wa is equal to or greater than 70% of the maximum width Wb. In this embodiment, the maximum width Wb may reside in the position P3 of the line orthogonal to the axial direction of the rod and passing through the center of the guide ring 7; and the sides of the frame 5A may be formed such that the position P3 do not significantly protrude radially outward of the position P2 (the width Wa is equal to or greater than 70% of the maximum width Wb).

Normally, a line snagged on the frame 5A of the line guide in a loop tends to release itself in the direction of the rod tip. Since the position of the inflection point P2 makes the highest resistance, the width Wa at the position of the inflection point P2 may be equal to or greater than 70% of the maximum width Wb of the ring retainer 5b such that a snagged line can be released from the frame upon receipt of an amount of tensile force (a tensile force produced by the weight attached to the terminal tackle).

As shown in the figure, the sides of the frame 5A between the position P2 and the position P3 should preferably be formed linearly in a plane view so as to allow the line to move smoothly and release the snagged line effectively. Particularly when the width Wa is equal to or greater than 90% (and not more than 100%) of the maximum width Wb and the sides of the frame 5A are formed linearly, a line snagged in a loop can be released smoothly.

Figure 3A:
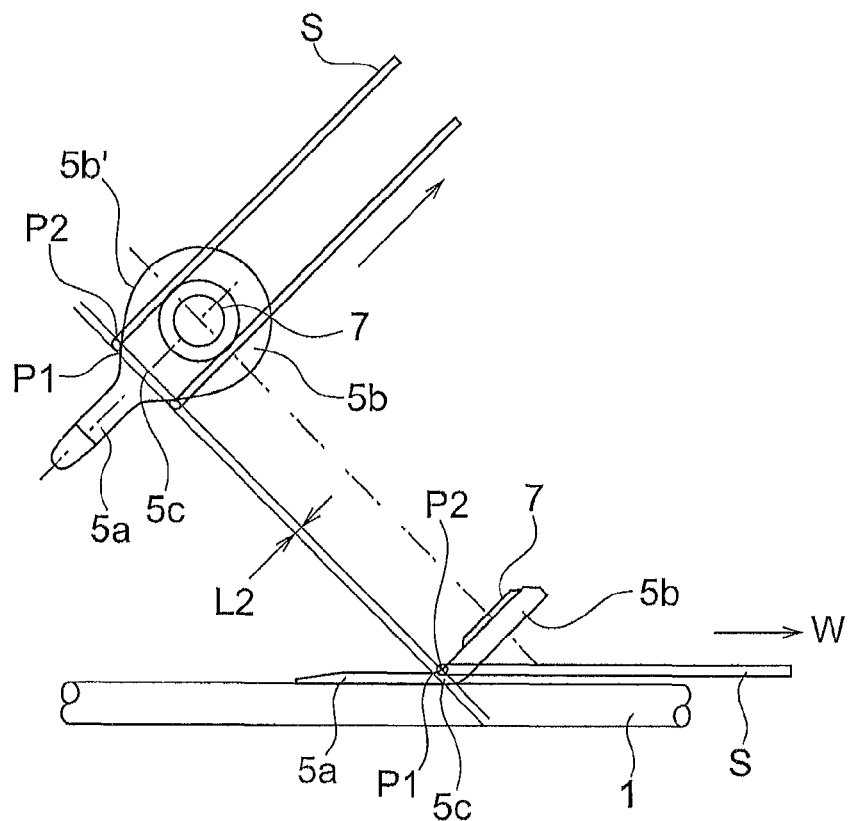
FIG. 3a illustrates the entire configuration of a conventional line guide.
Figure 3B:
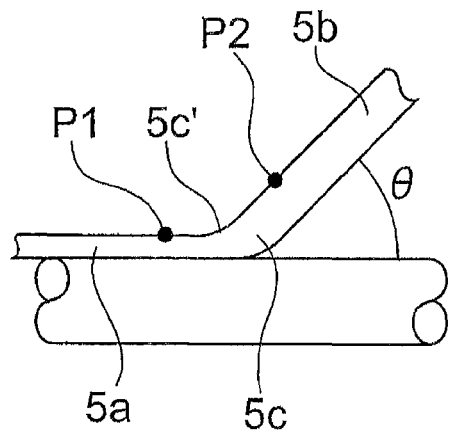
FIG. 3b is a side view of a main part of the same.

Reference is now made on FIG. 3 to describe the circumstances where a line S is snagged on a conventional line guide in a loop.

As shown in FIG. 3, if the ring retainer significantly protrudes widthwise, the line S snagged in a loop on the region between the fixing portion 5a and the ring retainer 5b of the line guide may be subjected to a high resistance. That is, even if the slant angle θ of the ring retainer 5b is the same as shown in FIG. 2 and the line S is subjected to the same tensile load, the line S may be stopped at the inflection point P2 adjacent to the ring retainer 5b and may be hard to move along the side surface 5b' of the ring retainer 5b (in conventional line guides, the proportion of the width Wa at the inflection point to the maximum width Wb of the ring retainer 5b is about 20 to 60%).

As shown in FIG. 3, if the connecting portion 5c connecting the ring retainer 5b and the fixing portion 5a has a curved surface extending for a short distance L2, the line S may tend to be snagged on the curved surface (the base of the ring retainer) and stopped at the portion (the infection point P2) ahead of the curved surface significantly protruding in a radial direction. Thus, the line becomes unreleasable. If a metallic plate is pressed and bent to form a raised ring retainer, the connecting portion 5c may have a curved surface extending for a very short distance L2, which may probably cause the line S to be snagged and stopped at this position.

Next, reference is made on Table 1 below to describe the results of an actual test on line guides shaped as shown in FIG. 2 where the width Wa and the maximum width Wb are varied.

TABLE 1

| Guide | Outer Diameter of Ring (mm) | Wa (mm) | Wb (mm) | Wa/Wb (%) | Angle (average) |
|-------|-----------------------------|---------|---------|-----------|-----------------|
| A | 3.9 | 4.8 | 5.7 | 84.2 | 46 |
| B | 4.6 | 5.2 | 6.5 | 80.0 | 51 |
| C | 5.3 | 5.3 | 7.3 | 72.6 | 64 |
| D | 5.3 | 4.69 | 7.21 | 65.0 | 69 |
| E | 5.3 | 4.38 | 7.29 | 60.1 | 76 |
| F | 5.3 | 3.98 | 7.23 | 55.0 | 84 |

In the test, line guides A to F having different Wa and Wb values were prepared and mounted on the outer surface of a rod; and a line (nylon 1) was snagged on the line guides in a loop and subjected to a predetermined load W, while the tip end of the rod was gradually turned down until the line is released from the line guide at an angle (a slant angle of the rod with respect to a horizontal line; see FIG. 1). The above table shows the measured angles. The line guides A to F were formed of prepregs stacked together with the angle θ by which the ring retainer raises from the fixing portion being 45°.

In boat fishing, a line is often snagged on a line guide upon throwing of a terminal tackle. If the line snagged on the line guide is released when the rod tip angle shown in FIG. 1 is equal to or smaller than about 70°, the operability of the rod is determined to be good. In the test shown in Table 1, two line guides were prepared for each of the line guides A, B, and C, and each of these line guides was subjected to the test three times to find an average of the angle at which the line snagged in a loop was released. Meanwhile, one line guide was prepared for each of the line guides D, E, and F, and each of these line guides was subjected to the test three times to find an average of the angle at which the line snagged in a loop was released.

For the line guide C (Wa/Wb is 72.6%), the snagged line was released at 64°; and for the line guide D (Wa/Wb is 65.0%), the snagged line was released at 69°.

These test results indicate that, if the Wa/Wb of a line guide is 70.0% or higher, a snagged line can be surely released when the rod tip angle is 70° or smaller, which confirms good operability of the fishing rod. As for the line guide D where Wa/Wb is 65.0%, the snagged line was released at an angle of 69°; therefore, if Wa/Wb is 70% or higher, the snagged line can be surely released at an angle of 70° or smaller, which confirms good operability of the fishing rod. It should be noted that actual fishing rods may have a flexible rod tip; and in such a case, the angle at which the line snagged in a loop is released in the angle shown in Table 1 may tend to be slightly larger.

Embodiments of the line guide of the present invention are not limited to the above descriptions and are susceptible to various modifications.

As described above, the length L1 of the surface 5c' of the connecting portion 5b may be large enough to allow a line snagged on the fixing portion to move onto the ring retainer 5b and allow a line stopped at the inflection point P2 to be released. The surface 5c' of the connecting portion 5b may also be a slanted surface without a curve.

The frame of the line guide of this embodiment, which is formed of a fiber-reinforced resin, may also be formed of a metallic material such as SUS; and the outer surface of the rod may have two fixing portions fixed thereon (double foot guide). Further, the above-described configuration of a line guide may be either applied to all the line guides mounted on a rod or applied to line guides mounted on a tip portion of a rod.

What is claimed is:

1. A fishing line guide mounted on a fishing rod for guiding a line in an axial direction along the fishing rod, the fishing line guide comprising a frame,
   where in the frame includes a fixing portion fixed on an outer surface of the fishing rod, a ring retainer retaining a guide ring for admitting the line, and a connecting portion connecting the ring retainer and the fixing portion,
   wherein, for a width Wa of the frame at an inflection point between the connecting portion and the ring retainer and a maximum width Wb of the ring retainer, the frame is formed such that the width Wa is defined as one of: equal to 70% of the maximum width Wb, between 70% and 84.2% of the maximum width Wb, or equal to 84.2% of the maximum width Wb.

2. The fishing line guide of claim 1 wherein the frame has a side formed linearly from a position of the width Wa at the inflection point to a position of the maximum width Wb.

3. The fishing line guide of claim 1, wherein the fishing line guide is fixed on the outer surface of the fishing rod at a tip portion of the fishing rod.

4. The fishing line guide of claim 1, wherein the connecting portion extends from the fixing portion and inflectionally extends toward the ring retainer such that the connecting portion is integrated with the ring retainer and raises the ring retainer at a predetermined angle, and
   wherein the connecting portion has another inflection point between the connecting portion and the fixing portion.

* * * * *